(12) United States Patent
Cox

(10) Patent No.: US 7,819,611 B2
(45) Date of Patent: Oct. 26, 2010

(54) DRYWALL/SHEATHING CUTTING TOOL AND METHOD

(76) Inventor: Lonnie Cox, 11923 Rocky Lake Dr., Houston, TX (US) 77070

( * ) Notice: Subject to any disclaimer, the term of this patent is extended or adjusted under 35 U.S.C. 154(b) by 133 days.

(21) Appl. No.: 11/594,474

(22) Filed: Nov. 8, 2006

(65) Prior Publication Data

US 2008/0107495 A1     May 8, 2008

(51) Int. Cl.
  *B23C 3/00*    (2006.01)
  *B23C 3/12*    (2006.01)
  *B23C 5/10*    (2006.01)
  *B23B 51/00*   (2006.01)

(52) U.S. Cl. .................. 409/132; 409/180; 409/126; 409/214; 407/53; 408/26; 408/199; 408/225

(58) Field of Classification Search ............... 409/180, 409/138, 130, 210, 214, 218, 182, 126, 131–132; 407/53–54; 144/154.5, 136.95, 253.3, 371; 408/26, 22, 201, 199, 202, 225, 230, 1 R
See application file for complete search history.

(56) References Cited

U.S. PATENT DOCUMENTS

| | | | |
|---|---|---|---|
| 2,623,552 A * | 12/1952 | Compton et al. ............. | 408/21 |
| 3,289,717 A | 12/1966 | Dutot | |
| 3,774,279 A * | 11/1973 | Hunter ........................ | 407/30 |
| 4,359,302 A | 11/1982 | Payne | |
| 4,384,396 A | 5/1983 | Smolik | |
| 4,733,997 A * | 3/1988 | Ford et al. ................... | 409/84 |
| 4,960,352 A * | 10/1990 | Kishi .......................... | 409/180 |
| 5,004,385 A * | 4/1991 | Kishi .......................... | 409/180 |
| 5,143,490 A | 9/1992 | Kopras | |
| 5,570,978 A * | 11/1996 | Rees et al. ................... | 408/144 |

(Continued)

FOREIGN PATENT DOCUMENTS

JP    4-146018 A   *   5/1992

*Primary Examiner*—Erica E Cadugan
(74) *Attorney, Agent, or Firm*—C. Dale Quisenberry; Polasek, Quisenberry & Errington LLP

(57) ABSTRACT

A rotary cutting tool is provided for cutting an opening in a sheet of material (e.g., drywall) around a pre-installed item (e.g., an electrical box). The cutting tool may include a shaft, at least one cutter, a guide tip and a shoulder formed by a lower edge of the cutter adjacent the guide tip. The shoulder may have a width that corresponds to the width of a wall of the pre-installed item. The width of the shoulder may be equal to the width of the wall, or it may be slightly greater than the width of the wall. The guide tip may include a bearing to prevent marring of the wall of the item when the guide tip is rotating and in contact with the wall. An adjustable collar and corresponding bearing may also be disposed around the shaft for controlling a preferred cutting depth of the cutter. The cutting tool may be engaged with any suitable rotary tool, including one having an adjustable table for controlling a preferred cutting depth of the cutter. Related methods of using a cutting tool to cut an opening for receiving the item or box are also provided. The rotating guide tip may be moved into contact with the wall and the shoulder may be positioned above and/or in contact with an upper edge of the wall. The cutting tool is then moved around the wall while rotating to cut an opening in the material through which the item or box may be positioned.

21 Claims, 4 Drawing Sheets

U.S. PATENT DOCUMENTS

| | | | |
|---|---|---|---|
| 5,647,700 A * | 7/1997 | Velepec | 407/34 |
| 5,806,577 A * | 9/1998 | Durand | 144/142 |
| 6,048,142 A | 4/2000 | Hashimoto et al. | |
| 6,086,294 A * | 7/2000 | Danchine et al. | 409/138 |
| 6,095,723 A * | 8/2000 | Reynolds et al. | 407/54 |
| 6,452,097 B1 | 9/2002 | DeWall | |
| 6,758,639 B2 | 7/2004 | Risen, Jr. | |
| 6,867,369 B2 | 3/2005 | Wiggins | |
| 6,926,477 B2 * | 8/2005 | Allemann et al. | 409/130 |
| 2008/0193232 A1 * | 8/2008 | van Iperen | 407/54 |

* cited by examiner

Alternative embodiments, wherein the item is in the form of a telephone box, a cable box, a vent fan, a canister light, or a recessed speaker box.

Fig. 8

DRYWALL/SHEATHING CUTTING TOOL AND METHOD

BACKGROUND OF THE INVENTION

1. Field of the Invention

The present invention generally pertains to hand tools, and more particularly to a rotary cutting tool or bit for use with a power router or other rotary tool during the installation of drywall or sheathing.

2. Description of the Related Art

It is well known in the construction industry that the interior walls of most homes and many commercial buildings in the United States are constructed using drywall. It is also well known that a variety of steps in the building process are taken before the drywall is installed, or "hung" (e.g., electrical wiring and electrical outlet boxes, switch boxes, vent fans, and certain canister and other lights and devices are installed; telephone wire and telephone boxes are installed; cable wire and cable boxes are installed; speaker wire and recessed speaker boxes; vents; returns; plumbing pipes such as a drain; etc.). It is further known that these electrical, telephone, cable, etc. boxes and other devices extend past the "studs" (typically wood boards) to which they are attached by a distance generally equal to the thickness of the drywall that is to be attached to the studs. As such, when the drywall is installed, it is necessary to cut a hole or opening, generally rectangular or circular in shape, through which the outlet/switch boxes etc. extend, such that the outer edges of the boxes or devices are generally flush with the exterior surface of the drywall once the drywall is secured to the studs. The present invention relates to the process of cutting the openings or holes for the boxes or other devices.

Heretofore, these openings have been cut out or created in a variety of ways. One way to cut them out is "by hand" using a drywall knife or saw. Another way to cut them out is by using a power rotary tool such as a router and router bit. Examples of ways in which openings have been cut out are disclosed in various patents, such as, U.S. Pat. No. 4,359,302 (Payne), U.S. Pat. No. 4,384,396 (Smolik), U.S. Pat. No. 5,143,490 (Kopras), U.S. Pat. No. 6,452,097 (DeWall), U.S. Pat. No. 6,758,639 (Risen, Jr.) and U.S. Pat. No. 6,867,369 (Wiggens), for example. As will become apparent from the following description and discussion, the present invention is directed to an improved rotary tool and related method of cutting out these openings that overcomes the deficiencies in the previous methods and tools. More specifically, the present invention does a much better job of eliminating inaccuracies in precutting these openings before and during the installation of the drywall, such as the excessively oversized cutout openings that are created using currently available rotary bits. The present invention also reduces installation time.

SUMMARY OF THE INVENTION

In a broad aspect, the present invention is directed to a rotary cutting tool comprising: a shaft, at least one cutter, a guide tip, and a shoulder formed by a lower edge of the cutter adjacent the guide tip. Another feature of this aspect of the present invention is that the shoulder may have a predetermined width substantially corresponding to the width of a wall of an item installing during construction of a structure. Another feature of this aspect of the present invention is that the item may be one of an electrical box, a telephone box, a cable box, a vent fan, a canister light, and a recessed speaker box. Another feature of this aspect of the present invention is the shoulder may have a predetermined width slightly greater than the width of a wall of an item installing during construction of a structure. Another feature of this aspect of the present invention is that the width of the shoulder may be approximately $1/16$ of an inch greater than the width of the wall of the item. Another feature of this aspect of the present invention is that the tool may further include a bearing disposed around the guide tip. Another feature of this aspect of the present invention is that the tool may further include an adjustable collar disposed around the shaft for controlling a preferred cutting depth of the cutter. Another feature of this aspect of the present invention is that the tool may further include a bearing disposed around the shaft adjacent the collar. Another feature of this aspect of the present invention is that the tool may further include a rotary tool engaged with the shaft and having an adjustable table for controlling a preferred cutting depth of the cutter.

In another aspect, the present invention may comprise a rotary cutting tool comprising: a shaft, at least one cutter, a guide tip, and a shoulder formed by a lower edge of the cutter adjacent the guide tip, the shoulder having a predetermined width corresponding to the width of a wall of an item installing during construction of a structure. Another feature of this aspect of the present invention may be that the item may be one of an electrical box, a telephone box, a cable box, a vent fan, a canister light, and a recessed speaker box. Another feature of this aspect of the present invention may be that the item may be that the width of the shoulder is slightly greater than the width of the wall of the item. Another feature of this aspect of the present invention may be that the item may be that the width of the shoulder is approximately $1/16$ of an inch greater than the width of the wall of the item. Another feature of this aspect of the present invention may be that the item may be that the tool may further include a bearing disposed around the guide tip. Another feature of this aspect of the present invention may be that the tool may further include an adjustable collar disposed around the shaft for controlling a preferred cutting depth of the cutter, and a bearing disposed around the shaft adjacent the collar. Another feature of this aspect of the present invention may be that the tool may further include a rotary tool engaged with the shaft and having an adjustable table for controlling a preferred cutting depth of the cutter.

In still another aspect, the present invention may be a method of cutting an opening in a sheet of material to receive a pre-installed item having a wall forming a periphery, comprising: inserting a rotating cutting tool through the material at a position within the wall periphery; moving the rotating cutting tool towards the wall until a guide tip of the cutting tool contacts the wall and a shoulder on the cutting tool is positioned above an upper edge of the wall; and moving the rotating cutting tool around wall periphery while maintaining the guide tip in contact with the wall and maintaining the position of the shoulder above the upper edge of the wall. Another feature of this aspect of the present invention may be that the shoulder of the cutting tool is positioned above the upper edge of the wall and in contact with the upper edge of the wall, and maintained in that position as the rotating cutting tool is moved around the wall periphery. Another feature of this aspect of the present invention may be that the shoulder on the cutting tool has a width substantially corresponding to a width of the wall. Another feature of this aspect of the present invention may be that the shoulder on the cutting tool has a width that is slightly greater than a width of the wall.

Other features, aspects and advantages of the present invention will become apparent from the following discussion.

BRIEF DESCRIPTION OF THE DRAWINGS

FIG. 8 is a schematic representation of further embodiments of the present invention.

While the invention will be described in connection with the preferred embodiments, it will be understood that it is not intended to limit the invention to those embodiments. On the contrary, it is intended to cover all alternatives, modifications, and equivalents as may be included within the spirit and scope of the invention as defined by the appended claims.

DETAILED DESCRIPTION OF THE INVENTION

Figure 1:
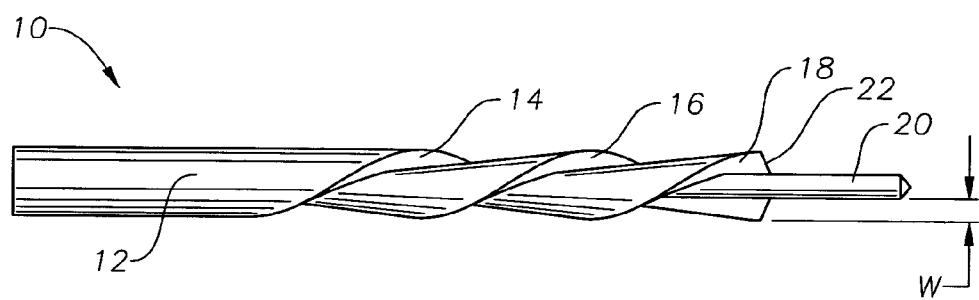
FIG. 1 is a side view of a specific embodiment of a cutting tool of the present invention.

Referring to the drawings in detail, wherein like numerals denote identical elements throughout the several views, there is shown in FIG. 1 a specific embodiment of a cutting tool 10 of the present invention having a shaft 12, a plurality of helical cutters 14, 16, and 18, and a guide tip 20. The transition from the last or bottom cutter 18 and the guide tip 20 defines a shoulder 22.

Figure 2:
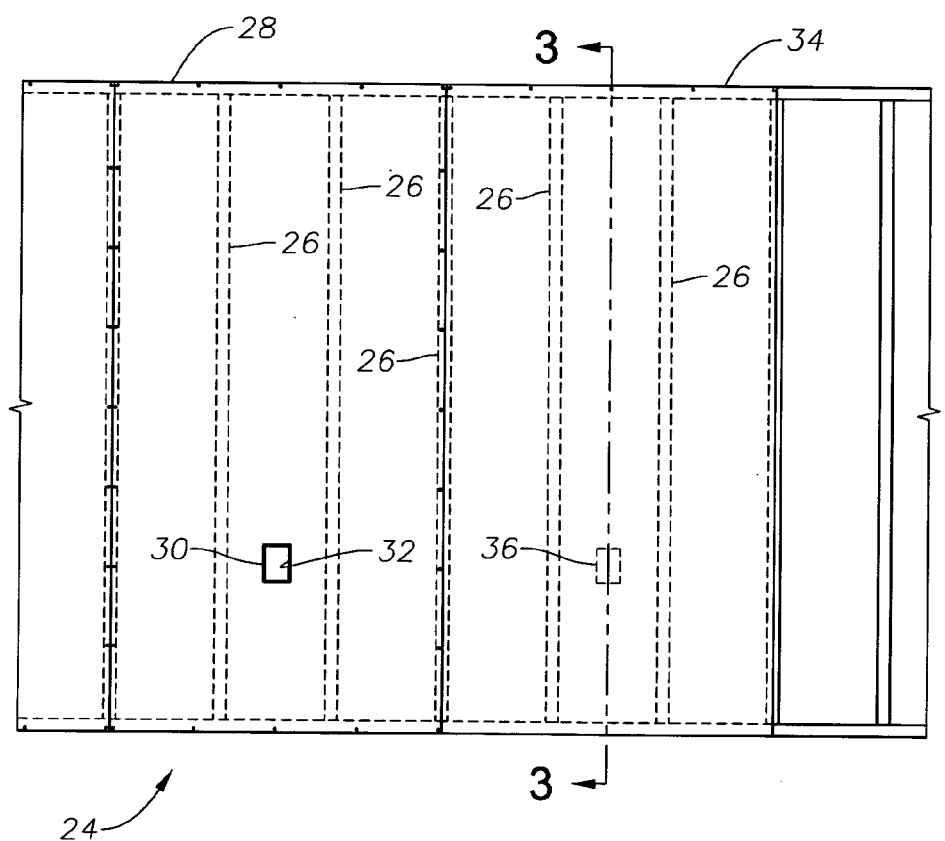
FIG. 2 is a front view showing an interior wall with some drywall attached thereto and the studs to which the drywall is attached shown by dashed lines, and also showing a sheet of drywall that has not yet been fully attached to the studs, as indicated by an electrical box shown in dashed lines.

Referring now to FIG. 2, a portion of an interior wall 24 is shown which is made using a number of vertical studs 26 shown as dashed lines. A sheet of drywall 28 is shown secured to the studs 26 and includes an electrical box opening 30 which is snugly fit around an electrical box 32. An electrical box 32 is being used here and in the Figures for illustration purposes only, and should not be taken as a limitation. The present invention can by used for cutting openings for any type of box, fixture or other device. Another sheet of drywall 34 is shown in the process of being secured to the studs 26, but before an opening has been cut for the electrical box 36, which is illustrated by dashed lines. This is better shown in FIG. 3, which is a cross-sectional view taken along line 3-3 of FIG. 2. Looking at FIG. 3, it can be seen that the upper edge of the sheet of drywall 34 has been secured to a top plate 38 that forms part of the wall frame along with studs 26. It can further be seen that the sheet of drywall 34 is being held out away from the studs 26 by the electrical box 36. In other words, the sheet of drywall 34 is resting against the electrical box 36. It is at this point that an opening is ready to be cut in the sheet of drywall 34 so that the drywall 34 will fit over and around the electrical box 36.

Figures 3, 4:
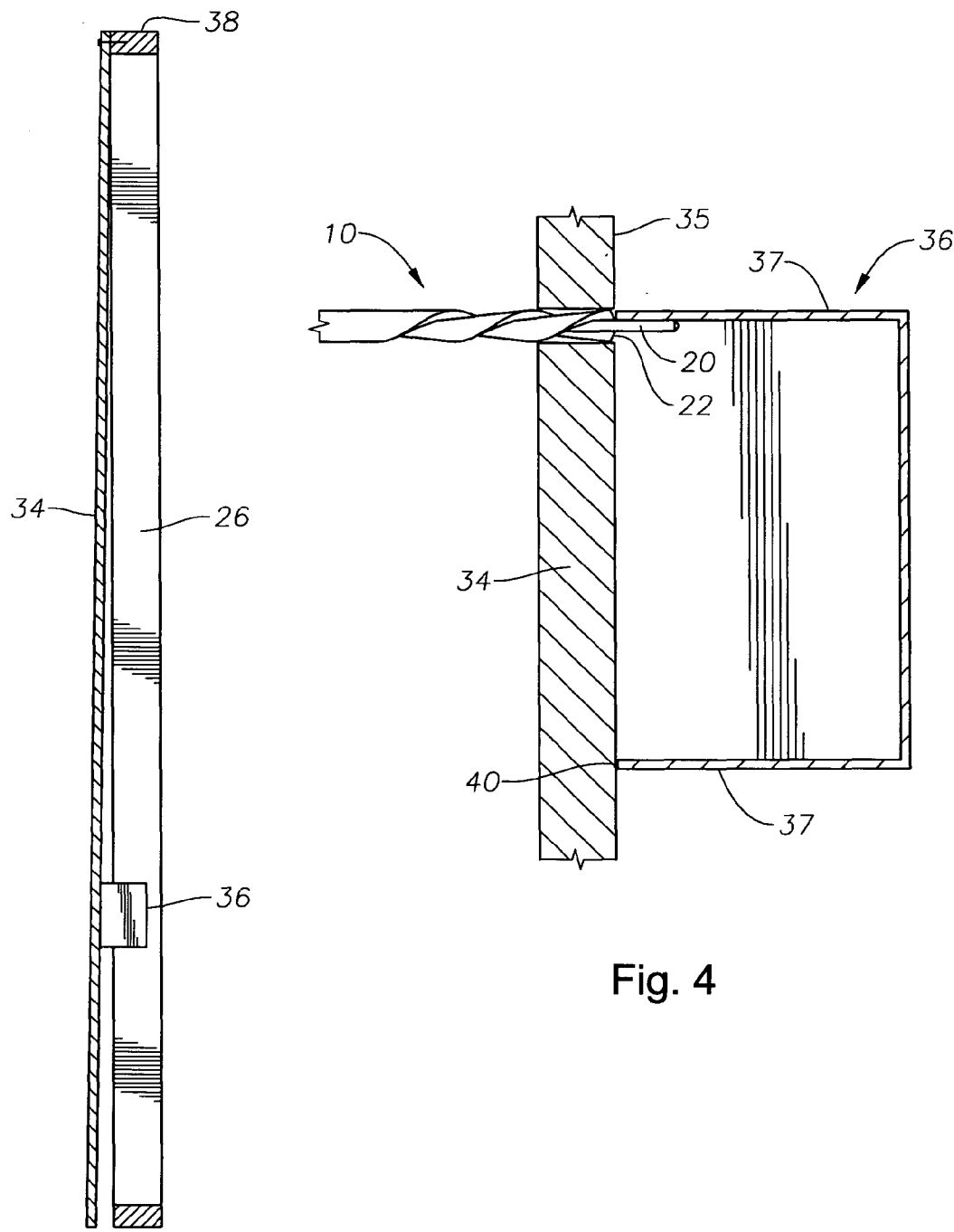
FIG. 3 is a cross-sectional view taken along line 3-3 of FIG. 2.
FIG. 4 is a side view in partial cross section showing the tool illustrated in FIG. 1 being used to cut an electrical box opening in drywall.

Referring now to FIG. 4, the cutting tool 10, which is attached to a rotary tool such as a high speed router (not shown), is pushed through the drywall 34 while spinning at a location somewhere inside the side walls 37 of the electrical box 36. With the shoulder 22 of the cutting tool 10 preferably positioned approximately flush with an inside surface 35 of the sheet 34, the rotating cutting tool 10 is then moved towards one of the side walls 37 until the guide tip 20 comes into contact with the side wall 37 and the shoulder 22 is resting on an outer edge 40 of the electrical box 36. At this point, with reference to FIG. 1, it can be seen that the width "W" of the shoulder 22 is preferably about equal to the width of the side walls 37. In a specific embodiment, the width "W" of the shoulder 22 may be slightly greater than the width of the side walls 37 (e.g., by 1/16 of an inch) so as to provide a bit of clearance for the electrical box 36 to fit through the opening being cut out with the cutting tool 10. Once the shoulder 22 is resting on the edge 40 and the guide tip 20 is touching the side wall 37, the cutting tool 10—while rotating—is moved completely around the inside of the electrical box 36, keeping the shoulder 22 in contact with the edge 40 and the guide tip 20 in contact with the side walls 37 at all times. Once the complete periphery of the inside of the electrical box 36 has been traversed by the cutting tool 10, then an electrical box opening such as opening 30 will have been created or cut out, at which point the drywall 34 may be pushed in around the electrical box 36 and secured to the studs 26.

Figure 5:
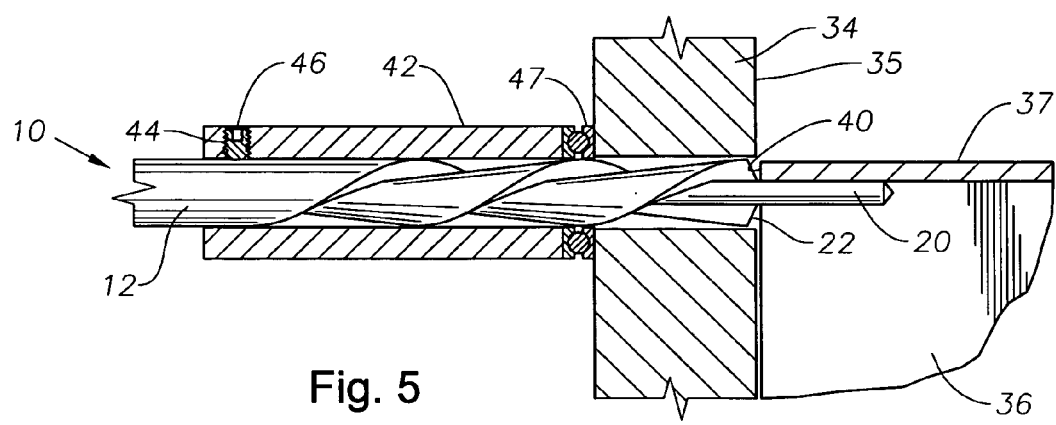
FIG. 5 is a side view in partial cross section showing a depth controller attached around the cutting tool illustrated in FIG. 1.

Referring now to FIG. 5, an adjustable collar 42 may be provided to control the depth that the cutting tool 10 extends into the drywall 34. The collar 42 may be a tubular member disposed around the shaft 12 and having a threaded bore 44 adapted to threadably engage a hex head screw 46. The screw 46 functions to secure the collar 42 to the shaft 12 of the cutting tool 10 at the desired depth setting. A bearing 47 is disposed between the collar 42 and the drywall 34 so as to prevent the rotating collar 42 from burning, shredding or otherwise damaging the drywall 34. As discussed above, the preferred depth setting is set such that the shoulder 22 is substantially flush with the inside surface 35 of the drywall 34 while at the same time resting against the edge 40 of the side walls 37 of the electrical box 36.

Figure 6:
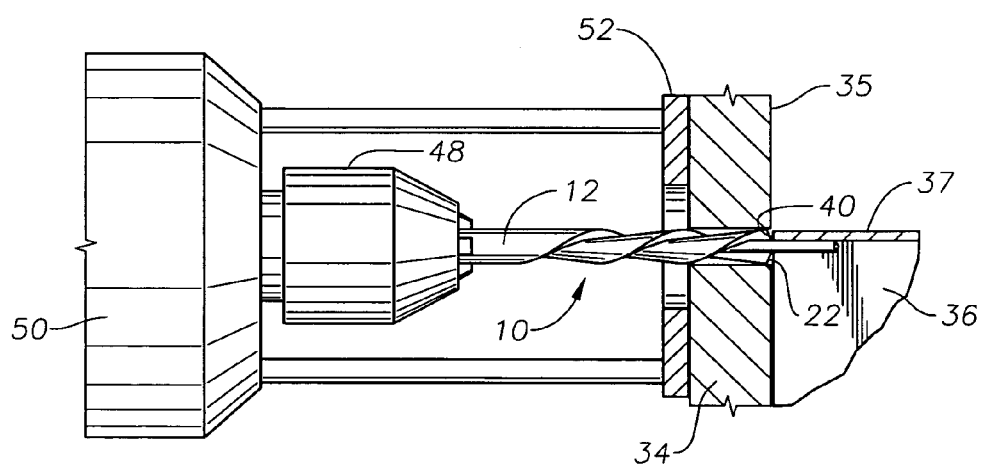
FIG. 6 is a side view showing the cutting tool illustrated in FIG. 1 attached to the chuck of a high speed rotary tool having an adjustable table being used to control how far the cutting tool extends through the drywall.

FIG. 6 illustrates another approach to controlling the depth that the cutting tool 10 extends into the drywall 34. In this embodiment, the cutting tool 10 is shown with its shaft 12 tightened in a chuck 48 of a high speed rotary tool 50, such as a Dremel® rotary tool, which is provided with an adjustable table 52. The table 52 is preferably adjusted such that the shoulder 22 on the cutting tool 10 is substantially flush with the inside surface 35 of the drywall 34 while at the same time resting against the edge 40 of the side walls 37 of the electrical box 36.

Figure 7:
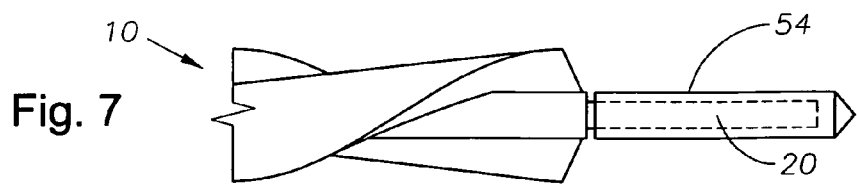
FIG. 7 is a side view of another specific embodiment of a cutting tool of the present invention, this one having a rotatable bushing or bearing attached to the tip of the tool.

With reference to FIG. 7, in another specific embodiment, the cutting tool 10 may be provided with a rotatable bearing or bushing 54 disposed around the guide tip 20. In this manner, the rotating guide tip 20 does not come into direct contact with the side walls 37 of the electrical box 36, thereby avoiding the potential for the guide tip 20 to burn the side walls 37 when rotating at a high speed.

It should now be readily apparent that the cutting tool and method of the present invention has a number of benefits and advantages over the prior tools and methods of cutting openings in drywall. For example, with the present invention, overcutting or creating excessively oversized openings that require repair or replacement is avoided. The aspect of the present invention directed to limiting the depth of penetration into the boxes and other devices minimizes the risk of damage to wires and parts inside the box or device. Another advantage of the present invention is its increased efficiency of drywall installation and reducing required accuracy of measurements.

It is to be understood that the invention is not limited to the exact details of construction, operation, exact materials or embodiments shown and described, as obvious modifications and equivalents will be apparent to one skilled in the art. For example, as mentioned previously, the Figures and above description have used an electrical box as the item for which an opening is needed. But that that should not be taken as a limitation, as the present invention may be employed for creating openings for any type of box, device, fixture, etc., including but not limited to electrical outlet boxes, electrical switch boxes, vent fans, canister lights, telephone boxes, cable boxes, recessed speaker boxes, vents, returns, plumbing pipes, plumbing drains, brackets, receiving pieces, template devices, doors and windows. Also, while the present invention has been described and illustrated in connection with a sheet of drywall, the present invention may be employed when cutting an opening in any type of material, whether it be drywall, sheathing, gypsum board, plywood, peg board, pressed board, siding, etc. Accordingly, the invention is therefore to be limited only by the scope of the appended claims.

The invention claimed is:

1. A rotary cutting tool comprising:
a shaft defining a longitudinal axis,
at least one axially-extending helical cutter adapted for performing lateral cutting, as the rotary cutting tool moves laterally, to create an opening in a sheet of material,
a guide tip having a pointed end, and
a shoulder formed by a lower edge of the at least one cutter adjacent the guide tip, wherein the shoulder has a predetermined width slightly greater than the width of a wall of an item installed during construction of a structure, and the shoulder is adapted for sliding engagement with an upper edge of the wall, the shoulder and the guide tip cooperating to guide the at least one cutter around a periphery of the wall to cut the opening in the sheet of material, the opening corresponding to the wall periphery.

2. The rotary cutting tool of claim 1, wherein the shoulder has a predetermined width substantially corresponding to the width of the wall of an item installing during construction of the structure.

3. The rotary cutting tool of claim 2, wherein the item is one of an electrical box, a telephone box, a cable box, a vent fan, a canister light, and a recessed speaker box.

4. The rotary cutting tool of claim 1, wherein the item is an electrical box.

5. The rotary cutting tool of claim 1, wherein the width of the shoulder is approximately 1/16 of an inch greater than the width of the wall of the item.

6. The rotary cutting tool of claim 1, further including a bearing disposed around the guide tip.

7. The rotary cutting tool of claim 1, further including an adjustable collar disposed around the shaft for controlling a preferred cutting depth of the at least one cutter.

8. The rotary cutting tool of claim 7, further including a bearing disposed around the shaft adjacent the collar.

9. The rotary cutting tool of claim 1, further including a rotary tool engaged with the shaft and having an adjustable table for controlling a preferred cutting depth of the at least one cutter.

10. A method of cutting an opening in a sheet of material to receive a pre-installed item having a wall forming a periphery, comprising:
rotating and inserting the rotary cutting tool of claim 1 through the material at a position within the wall periphery;
moving the rotary cutting tool towards the wall until the guide tip of the cutting tool contacts the wall and the shoulder on the cutting tool is positioned above the upper edge of the wall; and
moving the rotary cutting tool around wall periphery while maintaining the guide tip in contact with the wall and maintaining the position of the shoulder above the upper edge of the wall.

11. The method of claim 10, wherein the shoulder of the cutting tool is positioned above the upper edge of the wall and in contact with the upper edge of the wall, and maintained in that position as the rotary cutting tool is moved around the wall periphery.

12. The method of claim 10, wherein the guide tip has an axially-extending guide surface.

13. The method of claim 10, wherein the the sheet of material is a sheet of drywall.

14. The method of claim 10, wherein the item is an electrical box.

15. A rotary cutting tool comprising:
a shaft defining a longitudinal axis;
at least one axially-extending helical cutter adapted for performing lateral cutting, as the rotary cutting tool moves laterally, to create an opening in a sheet of material,
a guide tip having a pointed end, and
a shoulder formed by a lower edge of the at least one cutter adjacent the guide tip, the shoulder having a predetermined width corresponding to the width of a wall of an item installing during construction of a structure, and the wherein the shoulder is adapted for sliding engagement with an upper edge of the wall, the shoulder and the guide tip cooperating to guide the at least one cutter around a periphery of the wall to cut the opening in the sheet of material, the opening corresponding to the wall periphery.

16. The rotary cutting tool of claim 15, wherein the item is one of an electrical box, a telephone box, a cable box, a vent fan, a canister light, and a recessed speaker box.

17. The rotary cutting tool of claim 15, wherein the guide tip has an axially-extending guide surface.

18. The rotary cutting tool of claim 15, wherein a bushing is disposed around the guide tip.

19. The rotary cutting tool of claim 15, further including a bearing disposed around the guide tip.

20. The rotary cutting tool of claim 15, further including an adjustable collar disposed around the shaft for controlling a preferred cutting depth of the cutter, and a bearing disposed around the shaft adjacent the collar.

21. The rotary cutting tool of claim 15, further including a rotary tool engaged with the shaft and having an adjustable table for controlling a preferred cutting depth of the at least one cutter.

* * * * *